United States Patent [19]
Day et al.

[11] Patent Number: 5,996,015
[45] Date of Patent: Nov. 30, 1999

[54] METHOD OF DELIVERING SEAMLESS AND CONTINUOUS PRESENTATION OF MULTIMEDIA DATA FILES TO A TARGET DEVICE BY ASSEMBLING AND CONCATENATING MULTIMEDIA SEGMENTS IN MEMORY

[75] Inventors: Michael Norman Day, Round Rock; Leo Yue Tak Yeung, Austin, both of Tex.

[73] Assignee: International Business Machines Corporation, Armonk, N.Y.

[21] Appl. No.: 08/961,706

[22] Filed: Oct. 31, 1997

[51] Int. Cl.$^6$ .................................................. G06F 13/00
[52] U.S. Cl. ........................ 709/226; 709/219; 709/231
[58] Field of Search ..................................... 709/201, 202, 709/203, 212, 213, 217, 218, 219, 223, 225, 226, 229, 231, 232, 300

[56] References Cited

U.S. PATENT DOCUMENTS

| | | | |
|---|---|---|---|
| 4,949,248 | 8/1990 | Caro | 709/203 |
| 5,414,644 | 5/1995 | Seaman et al. | 702/183 |
| 5,442,389 | 8/1995 | Blahut et al. | 348/7 |
| 5,519,435 | 5/1996 | Anderson | 348/8 |
| 5,583,937 | 12/1996 | Ullrich et al. | 380/20 |
| 5,603,058 | 2/1997 | Belknap et al. | 710/35 |
| 5,606,359 | 2/1997 | Youden et al. | 348/7 |
| 5,621,728 | 4/1997 | Lightfoot et al. | 370/60.1 |
| 5,625,407 | 4/1997 | Biggs et al. | 348/16 |
| 5,631,693 | 5/1997 | Wunderlich et al. | 348/7 |
| 5,671,225 | 9/1997 | Hooper et al. | 370/468 |
| 5,754,784 | 5/1998 | Garland et al. | 709/219 |

*Primary Examiner*—Viet D. Vu
*Attorney, Agent, or Firm*—Robert V. Wilder; Richard A. Henkler

[57] ABSTRACT

A method and implementing computer system is provided including a multimedia server connected in a network configuration with client computer systems. The multimedia server includes various functional units which are selectively operable for delivering and effecting the presentation of multimedia files to the client such that a plurality of multimedia files are seamlessly concatenated on the fly to enable a continuous and uninterrupted presentation to the client. In one example, client selected video files are seamlessly joined together at the server just prior to file delivery from the server. The methodology includes the analog to digital encoding of multimedia segments followed by a commonization processing to ensure that all of the multimedia segments have common operating characteristics. A seamless sequential playlist or dynamically created playlist is assembled from the selected and commonized segments and the resources needed to deliver and play the playlist are reserved in advance to assure resource availability for continuous transmission and execution of the playlist. At a predetermined point prior to an end point of each selected multimedia segment, the next selected segment is initialized and aligned in memory in preparation for a seamless switch to the next segment at the end of a previous segment, thereby providing a seamless flow of data and a continuous presentation of a plurality of selected multimedia files to a client system.

22 Claims, 3 Drawing Sheets

METHOD OF DELIVERING SEAMLESS AND CONTINUOUS PRESENTATION OF MULTIMEDIA DATA FILES TO A TARGET DEVICE BY ASSEMBLING AND CONCATENATING MULTIMEDIA SEGMENTS IN MEMORY

RELATED APPLICATIONS

The present application is related to the following co-pending applications filed on or about Oct. 31, 1997: "DATA TRANSFER COUPLING SUBSYSTEM", Ser. No. 08/958,823, filed Oct. 28, 1997, "FILE LIST PROCESSING", Ser. No. 08/958,824, filed Oct. 28, 1997, "SCALEABLE NETWORK TRANSPARENT ACCESS FRAMEWORK FOR MULTIMEDIA SERVING", Ser. No. 08/961,704, filed Oct. 31, 1997, and "METHOD FOR REAL TIME DETERMINISTIC DELIVERY OF MULTIMEDIA DATA IN A CLIENT/SERVER SYSTEM", Ser. No. 08/961,468, filed Oct. 31, 1997, all of which are assigned to the assignee of the present application and included herein by reference.

FIELD OF THE INVENTION

The present invention relates generally to information processing systems and more particularly to a methodology and implementation for displaying a plurality of video segment files in a continuous seamless presentation.

BACKGROUND OF THE INVENTION

In network computer systems, a plurality of client computers are typically connected together and to one or more server computers in the network. A network may be established through the hard-wired interconnection of a plurality of computer terminals and servers in a local network or on a wider scale such as the Internet or world wide web which may include telecommunication links. In any case, the network server or servers act as the central control unit for providing access to files, programs and program execution to the individual computers connected within the network.

With the increasing use of networks in general and multimedia presentations in particular, new opportunities are being developed for the design and delivery of data resources and assets in multimedia networks. In many applications, multimedia presentations are designed and created "on the fly" for delivery and presentation to both digital and analog display systems. For example, a user or "client" on a network or on the Internet may select a series of "active" video display segments or "movies" to be presented on the user's display device. Alternatively, a network administrator or manager may wish to assemble a series of "active" video segments on a server to be available to individual users on demand. In another application, a broadcast station may select and call for the presentation of a series of video segments for broadcast through associated stations to analog display devices of subscribers. For example, for an advertisement clip insertion, when the physical storage device is not large enough to store the entire content, segments have to be stored in multiple physical storage devices. In either the network or the broadcast application, it is important that the display of the sequential segments be continuous or "seamless" since any discontinuity in the data stream being delivered will result in either a loss of data or a "freeze" or other discontinuity in a displayed "moving" video presentation.

Moreover, in many server file systems, many different multimedia files may be stored for selective access and presentation. Such files may be selected individually for presentation or such files may be selected in groups. Many of the files contain both video content and corresponding audio content. Moreover, since all of the video files are not generally provided from the same source, the files exist in the file system or library in various formats and have various "operating characteristics". When any of the files are called for presentation, several "initializing" processing steps are required before the selected file or files can be presented. For example, with video files, the encoding rate of the file must be accommodated with the bit rate or transfer rate of the communication link, and the "play rate" and resolution of the display device. However, in "real time" or "on-the-fly" applications, the initialization process delay for sequential video or audio segments for example, may cause gaps, "freezes", or "black screen" break-up of video presentations, and possibly data loss or other very undesirable effects during the video or audio or other multimedia presentations.

Thus, there is a need for an improved multimedia presentation methodology which is effective to assemble a plurality of selected multimedia files and provide a continuous data flow to enable a seamless and continuous presentation of the selected multimedia data files.

SUMMARY OF THE INVENTION

A method and implementing computer system is provided in which a plurality of multimedia files are seamlessly concatenated on the fly to enable a continuous presentation of the multimedia files. In one example, video files are seamlessly joined together just prior to file delivery from a server library to network clients to enable a continuous and uninterrupted flow of multimedia data and a corresponding seamless video presentation of the selected files to one or more designated display devices of the client. The methodology includes the analog to digital encoding of multimedia segments followed by a commonization processing to insure that all of the multimedia segments have common operating characteristics. A seamless sequential playlist is assembled from the selected and commonized segments and the resources needed to deliver and play the playlist are reserved in advance to assure resource availability for continuous transmission and execution of the playlist. At a predetermined point prior to an end point of each multimedia segment, the next selected segment is initialized and aligned in memory in preparation for a seamless switch to the next segment at the end of a previous segment, thereby providing a seamless flow of data and a continuous presentation of a plurality of selected multimedia files to a client system in such a way that the multimedia data received is assembled from multiple separate file segments.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
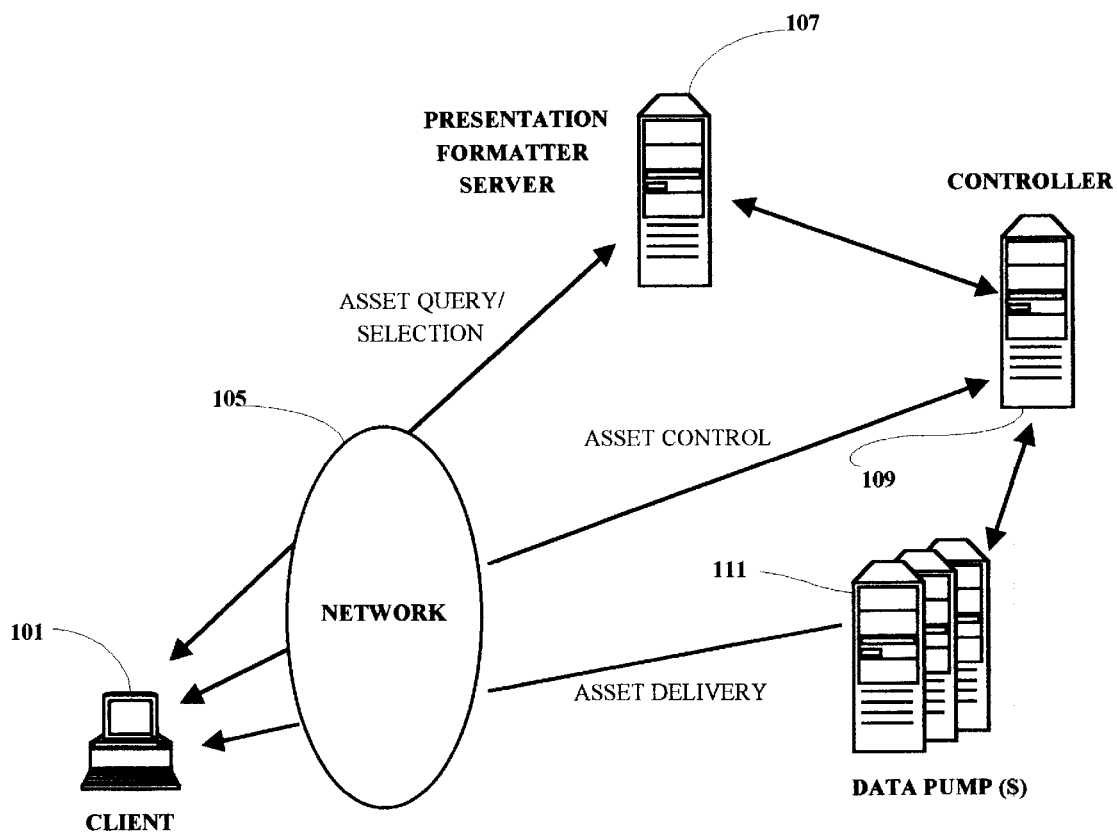
FIG. 1 is a diagram of a networked computer system in which the present invention may be implemented.
Figure 2:
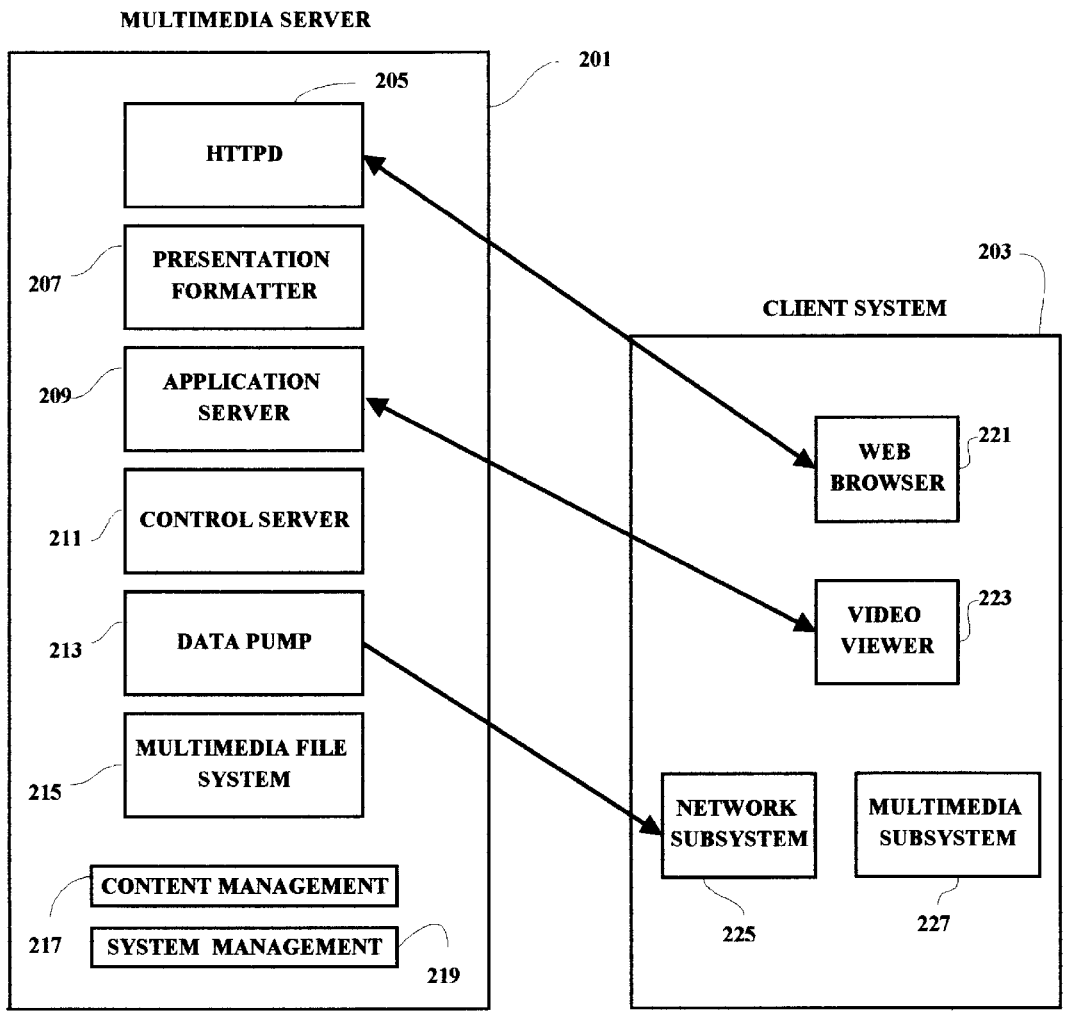
FIG. 2 is a schematic diagram of a simplified system showing selected components and subsystems of a networked computer system in which the present invention may be implemented.

With reference to FIG. 1, there is shown a schematic diagram of the main system components for an exemplary multimedia server embodiment in a network environment. In general, circuit details beyond those shown in the Figures are not specified to any greater extent than that considered necessary as illustrated, for the understanding and appreciation of the underlying concepts of the present invention and in order not to obfuscate or distract from the teachings of the present invention. The illustrated components of FIG. 1 include a client terminal 101 which can include a digital video terminal in a PC arrangement or an analog video terminal arranged to receive analog data for display. The client terminal 101 is connected through a network configuration 105 to a formatter server 107. The server system, in addition to the formatter server 107, further includes a controller unit 109 and a data pump 111 which are connected together to provide various multimedia functions including asset/query selection, asset control and asset delivery, respectively, as illustrated. The main functional server units 107, 109 and 111 may be arranged in separate machines as illustrated for larger systems or may be combined in one server device as illustrated in FIG. 2 for other systems. The multimedia server can store and deliver real-time, streamed MPEG compressed audio and video file content.

As shown in FIG. 2, a multimedia server 201 includes an HTTPD unit for web communications, a presentation manager 207, an application server 209, a control server unit 211, a data pump arrangement 213 (which may include a plurality of data pumps in parallel), and a multimedia file system 215. The multimedia server also includes a content management data base 217 and a system management unit 219. The various sections of the multimedia server 201 are arranged for connection to a client system 203 which may include a web browser 221, a video viewer device 223 as well as a network subsystem 225 and a multimedia subsystem 227.

The presentation formatter server 107 controls how clients view information on available assets and select specific assets for viewing. The formatter 107 also runs an HTTP link system to enable communication between a client web browser and the server system. The data pump 111 stores multimedia files, which are also referred to as multimedia assets, and delivers assets to the client. The data pump 111 is arranged to play a file to a client across a network 105 as shown. The controller 109 of the system coordinates the various functions of the system and is made up of two parts viz. an application server 209 and a control server 211. The control server is the main control point for the setup and delivery of an asset to the client represented by terminal 101. The control server 211 functionality is to provide resource management and admission control for the entire server complex and includes the selection of data pumps and command processing. By controlling the number of multimedia or audio/video data streams, the control server 211 ensures that the quality of the service is maintained across the system. Specifically, the control server provides a plurality of multimedia file data stream control functions including the functions of "play", "stop", "pause", "rewind", "forward" and "seek". The control server also provides resource management, including admission control and load balancing, for both playing streams and content loading. In addition, the control server 211 stores a catalog of multimedia assets available on one or more data pumps 111. The application server 209 handles communication with the client requesting an asset. For example, an application server receives requests from a client and can issue VCR commands to control individual streams. The application server 209 can also include an optional content management database 217 containing additional information concerning the available assets, for example such information as the director, the subject and/or the actors for a particular video presentation.

Multimedia content management is handled through HTML forms on the server home page for example. Users can add, delete, change and view "attributes" of assets. Asset attributes include information such as encoding type, frame rate and play rate. Such attributes describe the characteristics of data in the file system and tell the server how to serve actual multimedia data stored in the file system. The server includes a tool that automatically determines the encoding type, frame rate and play rate when content is loaded through HTML forms. The attributes for a file can be complemented by additional information describing the asset. Such information, which may be defined by the user, can include additional informational items such as title, subject, actors, director, and date released as hereinbefore noted.

The multimedia server 201 is arranged for storage and delivery of video and audio presentations. Multimedia assets are placed in a file system 215 for storage and retrieval using a method called striping. Striping spreads the content of a multimedia file across all of the disks in a file system for optimized performance. Client code is installed on a client machine to enable the client to access server assets.

In the present example, the multimedia server 201 has three predefined presentation formatter programs in the formatter section 207. A first video selection allows a client to link to specific assets directly from an HTML page. In this mode, a page must be created with an explicit link to each video stored. This simple approach requires no additional asset information to be stored in the application server, and only basic attributes (for example, encoding type, frame rate, and play rate) are available and are supplied on the initial HTML page. Use of this presentation formatter is best when there are few assets and they are not added or deleted often.

A second presentation formatter, herein referred to as Video-on-Demand or VOD, allows a client to select a video from a dynamically generated list. This method avoids having to update a list of links each time an asset is added or deleted. Use of the VOD presentation formatter requires the creation of a database of additional asset information, such as title, subject, etc., that can be queried by the client. That database must exist in the application server 209 portion of the controller. The presentation formatter allows the client to search the content management database 217 and view a list of only those assets that are of interest to the client. For example, a client might search the system for all videos directed by a certain known director and released after 1977.

A third presentation formatter is referred to as the Multicast Video Guide. Using this formatter, a server administrator can schedule video broadcasts to a group of clients. This formatter allows clients to view a list of currently scheduled jobs and clients can join or leave a multicast session at any time. The three formatters can be used directly or modified, or other formatters may be written using API (Application Program Interface) calls provided by the server.

The following process describes in detail an exemplary methodology implemented in delivering a server asset to a client through the VOD presentation formatter which was referred to above in more general terms. When using the Video Selection Presentation formatter, where the user does not narrow a selection by search criteria, the process may skip directly to a subsequent step at which the client proceeds immediately to select a multimedia asset from a listing on a HTML page presented to the client.

Using the VOD presentation formatter, a client web browser 221 would request from the presentation formatter server 207 an HTML page containing links to a presentation formatter program. The presentation formatter server 207 then returns the requested page and the client web browser 221 then selects a search function from the page to initiate a search from the available assets. The presentation formatter server 207 receives the request and runs the Video-On-Demand or VOD presentation formatter program. The VOD formatter dynamically creates a search form based on the fields in the application server content management database 217 and returns the form via the presentation formatter server 207 to the client. The client completes the search field and sends the data to the presentation formatter server 207. The server 207 receives the request and runs the VOD presentation formatter program. The VOD presentation formatter send the query to the application server portion 209 of the controller, which, in turn, queries the content management database. The results are returned to the VOD presentation formatter which dynamically builds an HTML page and returns the page containing the search results to the client. The preceding steps are repeated as necessary to narrow the search.

The client then selects an asset from the HTML page. The presentation formatter server 207 receives the request and runs the VSP (video selection presentation) formatter program. The VSP formatter passes the selection request to the controller 211 where an HTML metafile is created containing the pertinent information regarding the selected asset. The metafile is returned via the presentation formatter server to the client. The client's web browser 221 receives the HTML metafile, and, based upon the encoding type of the video, launches the video client code, which invokes a multimedia player, e.g. video viewer 223, on the client system to play back the asset. The multimedia or video client code initiates a session with the application server portion 209 of the controller 211 to start the playback. Once the asset is playing, the client multimedia code uses the session to control the playback using VCR-style functions. The controller contacts the appropriate data pump 213 to initiate a data delivery session with the client. Once the session is connected, the asset can be started immediately or at the request of the client. The data pump 213 streams the data to the client and the client receives the data into its network subsystem 225 where data is passed to the multimedia player for presentation.

In many cases, a user or client may select a plurality of video files for presentation at the client terminal. In such cases, additional processing is required since many different multimedia files may be stored for selective access and presentation. Such files may be selected individually for presentation or such files may be selected in groups. Many of the files contain both video content and corresponding audio content. Moreover, since all of the video files are not generally provided from the same original source, the files exist in the file system or library in various formats and have various "operating characteristics". As previously discussed, when any of the files are called for presentation, several "initializing" processing steps are required before the selected file or files can be presented. For example, with video files, the encoding rate of the file must be accommodated with the bit rate or transfer rate of the communication link, and the "play rate" and resolution of the display device. However, in "real time" or "on-the-fly" applications, the initialization processing for sequential video or audio segments for example will cause gaps, "freezes", and possibly data loss or other very undesirable effects during the video or audio or other multimedia presentations.

Figure 3:
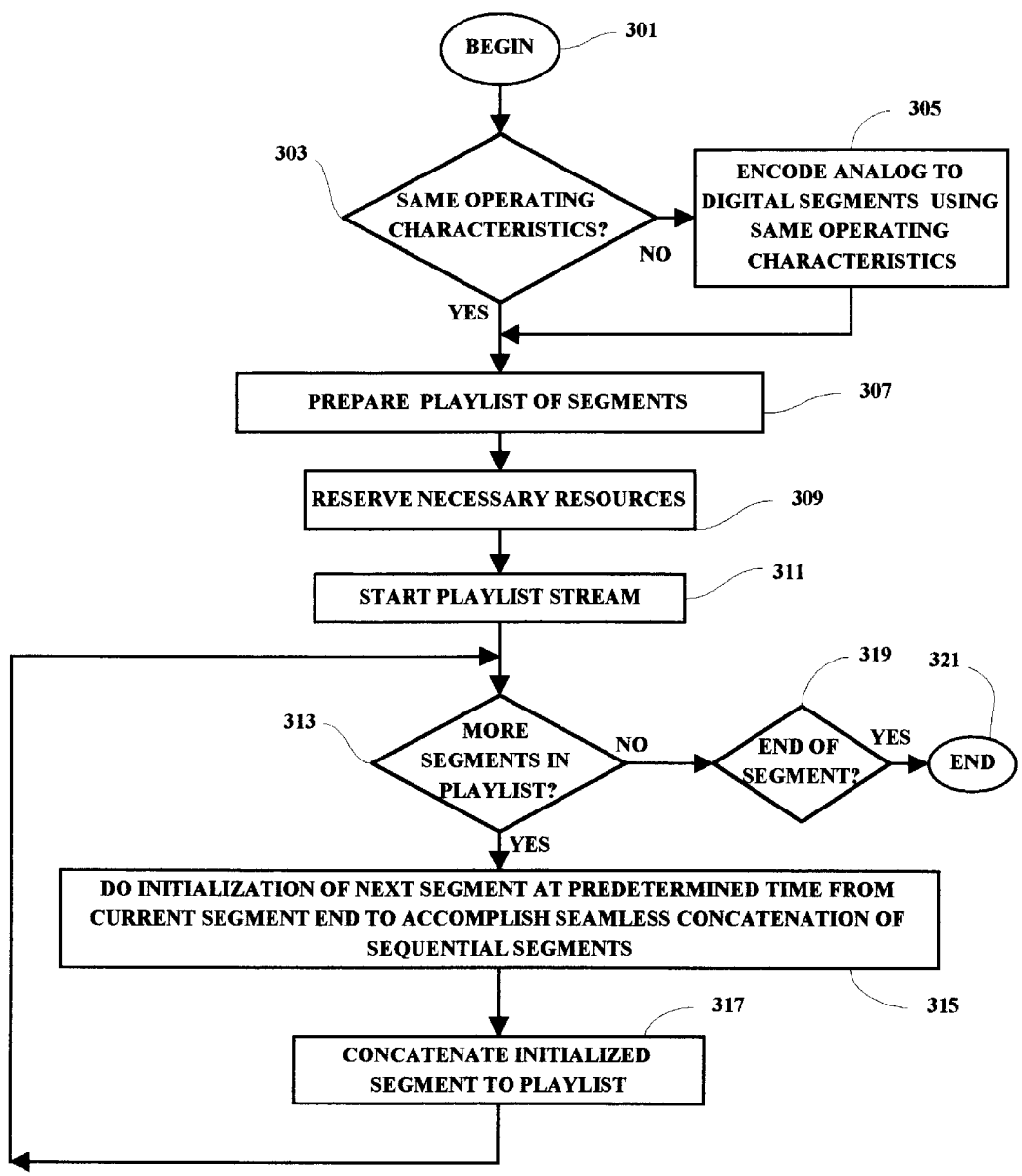
FIG. 3 is a flow chart illustrating an exemplary operational sequence for one implementation of the disclosed methodology.

The "commonization" process to ensure that all of the selected videos include the same operating characteristics, and the creation of a seamless data stream in order to avoid undesirable visual effects, is accomplished through the implementation of the exemplary processing methodology illustrated in the FIG. 3 flow chart. After the plurality of videos has been selected by a client, the process begins 301 and determines 303 whether all of the selected videos, in the present example, have the same operating characteristics (e.g. encoding rate of the video vs the transfer rate of the communication link, the play rate vs the display scan rate and resolution of the display device). If any of the videos has different operating characteristics, the video file is encoded 305 from analog to digital segments having the same operating characteristics to be compatible with or match the communication link and the display system.

When it has been determined that all of the video files have the same operating characteristics, a "playlist" is prepared 307. The playlist is a listing of the selected video segments which have been selected for presentation. Next, the necessary resources required to play the selected videos are reserved 309. The step of reserving resources 309 is necessary since any break in the video stream after the stream begins to flow to the display will cause an unacceptable break in the presentation or even a loss of data. Accordingly, the communication link must be reserved for the video presentation data stream to follow. Next, the first selected video segment begins to play 311 as the data stream is initiated "on-the-fly" from the server to the client terminal. While the first selected video segment is playing and the video data is streaming from the server 201 to the client system 203, a determination is made 313 as to whether there are more segments to be presented. If there are more segments 313, at a predetermined point prior to the end of the data stream for the first video segment, an initialization process is begun 315 for the second selected video segment in order to prepare the second selected video segment to be seamlessly concatenated to the end of the first selected video segment 317. The predetermined point is determined to be sufficient to accomplish the initialization process, i.e. the initialization process delay, of the next segment. That process is accomplished in order to provide a seamless and continuous flow of data from the server to the client without interruption at a transition point between the first selection and the second selection in the real-time transfer of the selected video files. When all of the selected video segments have been concatenated and have been presented to the client system, and there are no additional segments 313 to be presented, the process will end 321 at the end of the current segment 319. Because of the segment concatenation, there will be no discernible break in the video presentation between the first and second and subsequent selected video segments.

One of many possible pseudocode listings which could be implemented to practice the disclosed methodology is presented below.

```
Program Main( )
{
//reserve network connection resource
pid = OpenPort ("atmgroup",
                ATM_AAL5,
                1500000);
if (!pid) return NETWORK_CONNECTION_RESOURCE_ERROR;
//create playlist & preroll 1st asset
sid = OpenPlayStream  (video1",
                       pid,
                       1,
                       SEAMLESS_PLAY,
                       PAUSE);
if (!sid) return STREAM_RESOURCE_ERROR;
// add 3 more assets into playlist
if (UpdatePlayStream   ("video2",
                        sid,
                        2)
     return PLAYLIST_RESOURCE_ERROR;
if (UpdatePlayStream   ("video2",
                        sid,
                        3)
     return PLAYLIST_RESOURCE_ERROR;
if (UpdatePlayStream   ("video3",
                        sid,
                        4)
     return PLAYLIST_RESOURCE_ERROR;
//start play from entry 1
if (Play (sid, 1) return PLAY_ERROR;
While 1;
     if (GetPlayStreamStatus( ) = END_OF_STREAM) return (0);
return OK;
}
OpenPort (portgroup,
          porttype,
          destination,
          bandwidth)
{
// loop through all configured port to select port to service request
While 1;
     Select all data pump containing requested portgroup member;
     Select data pump with the highest bus bandwidth & CPU bandwidth
        available;
     Select port with same porttype within the selected data pump;
     if (selected port reserved bandwidth > requested bandwidth)
        Reserve selected port;
        Connect to requested network destination (bandwidth);
        break;          //exit loop, port found
     else
        try next port (same data pump, then all data pump);
     // end do while
     if (error) return error;
     return OK;
}
OpenPlayStream  (asset,
                 portid,
                 entry,
                 mode,
                 play_option)
}
     Open asset file;
     Get asset.normal_play_rate;
     if (pid.bandwidth < asset.normal_play_rate)
        return ERRROR;
     if (disk.bandwidth < asset.nrmal_play_rate)
        return ERROR;
     reserve disk bandwidth upto asset.normal_play_rate;
     insert asset into playlist;
//initialize asset
start separate thread to do pre-fetch asset file to cache;
if(play_option==AUTOSTART)
     //play entry 1
     Play(1);
else
     Pause( );
return OK;
}
UpdatePlayStream(asset,
                 streamid,
                 entry)
{
     Open asset file;
     Get asset.normal_play_rate;
     if (pid.bandwidth < asset.normal_play_rate)
        return ERROR;
     if (disk bandwidth < asset.normal_play_rate)
        return ERROR;
     reserve disk bandwidth up to asset.normal_play_rate;
     insert asset into playlist;
     return OK;
}
Pre-fetch( ) thread
{
     while 1;
     {
        Get space in cache;
        if space available in cache
           read data from file in disk to cache;
           if (no more data && cache remaining < pre-fetch delay of a new
              asset)
              call prefetch( ) prefetch next asset file data within the
                 playstream (playlist);
        else
           wait for space;
     }
     return OK;
}
Play (entry)
{
     Initialize video rendering device
     start play thread;
}
play thread
{
     While 1;
     {
        If cache data available
           send video data from cache;
        free space in cache;
        if pre-fetch wait for space
           wake-up pre-fetch thread;
     }
     return OK;
}
```

The method and apparatus of the present invention has been described in connection with a preferred embodiment as disclosed herein. The disclosed methodology may be implemented in a wide range of sequences, menus and screen designs in systems with real-time seamless delivery of multimedia content requirements, to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for processing a plurality of multimedia segments to form a continuous stream of information, said method comprising:
   streaming a first multimedia segment from a server device for playing on at least one target device;
   determining that a second multimedia segment is to be played following said first multimedia segment;
   preparing said second multimedia segment to be concatenated to said first multimedia segment;

concatenating said second multimedia segment to said first multimedia segment prior to a completion of a transfer of said first multimedia segment, said concatenating being operable to effect a seamless transition from said first multimedia segment to said second multimedia segment in transferring said first and second multimedia segments to the target device.

2. The method as set forth in claim 1 wherein said plurality of multimedia segments comprises more than two multimedia segments, said method including:

concatenating sequential ones of said plurality of multimedia segments to effect a seamless transition between sequential ones of said multimedia segments in transferring said plurality of multimedia segments to the target device.

3. The method as set forth in claim 2 wherein said target device is a network client terminal.

4. The method as set forth in claim 2 wherein said target device is a network server terminal.

5. The method as set forth in claim 2 wherein said target device is a digital to analog video device.

6. The method as set forth in claim 1 wherein said preparing further includes:

commonizing operating characteristics of said first and second multimedia segments such that said first and second multimedia segments have a common set of operating characteristics prior to being transferred to said target device.

7. The method as set forth in claim 6 and further including:

preparing a playlist, said playlist being comprised of a listing of multimedia segments to be transferred to said target device.

8. The method as set forth in claim 7 and further including:

determining resources required for transferring said multimedia segments to said target device; and reserving said resources to ensure a constant availability of said resources during a transfer of said multimedia segments to said target device.

9. The method as set forth in claim 1 wherein said multimedia segments are video segments.

10. The method as set forth in claim 9 and further including:

commonizing operating characteristics of said first and second multimedia segments such that said first and second multimedia segments have a common set of operating characteristics prior to being transferred to said target device.

11. The method as set forth in claim 10 and further including:

preparing a playlist, said playlist being comprised of a listing of multimedia segments to be transferred to said target device.

12. The method as set forth in claim 11 and further including:

determining resources required for transferring said multimedia segments to said target device; and reserving said resources to ensure a constant availability of said resources during a transfer of said multimedia segments to said target device.

13. The method as set forth in claim 1 wherein said multimedia segments are audio segments.

14. The method as set forth in claim 13 and further including:

commonizing operating characteristics of said first and second multimedia segments such that said first and second multimedia segments have a common set of operating characteristics prior to being transferred to said target device.

15. The method as set forth in claim 14 and further including:

preparing a playlist, said playlist being comprised of a listing of multimedia segments to be transferred to said target device.

16. The method as set forth in claim 15 and further including:

determining resources required for transferring said multimedia segments to said target device; and reserving said resources to ensure a constant availability of said resources during a transfer of said multimedia segments to said target device.

17. The method as set forth in claim 1 wherein said multimedia segments are video segments.

18. The method as set forth in claim 17 and further including:

commonizing operating characteristics of said first and second multimedia segments such that said first and second multimedia segments have a common set of operating characteristics prior to being transferred to said target device.

19. The method as set forth in claim 18 and further including:

preparing a playlist, said playlist being comprised of a listing of multimedia segments to be transferred to said target device.

20. The method as set forth in claim 19 and further including:

determining resources required for transferring said multimedia segments to said target device; and reserving said resources to ensure a constant availability of said resources during a transfer of said multimedia segments to said target device.

21. The method as set forth in claim 1 and further including:

preparing a playlist, said playlist being comprised of a listing of multimedia segments to be transferred to said target device.

22. The method as set forth in claim 1 and further including:

determining resources required for transferring said multimedia segments to said target device; and reserving said resources to ensure a constant availability of said resources during a transfer of said multimedia segments to said target device.

* * * * *